United States Patent [19]

Linder et al.

[11] Patent Number: 4,477,634

[45] Date of Patent: Oct. 16, 1984

[54] MODIFIED ACRYLONITRILE POLYMER CONTAINING SEMIPERMEABLE MEMBRANES

[75] Inventors: Charles Linder, Rehovot; Gershon Aviv, Tel Aviv; Mordechai Perry, Petach Tikvah; Reuven Kotraro, Rehovot, all of Israel

[73] Assignee: Aligena AG, Basel, Switzerland

[21] Appl. No.: 355,656

[22] Filed: Mar. 8, 1982

[30] Foreign Application Priority Data

Mar. 25, 1981 [CH] Switzerland .................. 2030/81

[51] Int. Cl.$^3$ ............................ C08F 8/34; C08F 8/30
[52] U.S. Cl. ............................ 525/327.1; 210/500.2; 210/767; 525/329.1; 525/349; 525/348; 525/353; 525/380
[58] Field of Search .................. 525/327.1, 329.1, 380, 525/384, 348, 353, 359.2, 349

[56] References Cited

FOREIGN PATENT DOCUMENTS

2505255 7/1976 Fed. Rep. of Germany .
786960 9/1954 United Kingdom ................ 525/384
1569563 6/1980 United Kingdom .

OTHER PUBLICATIONS

Chemical Abstracts, vol. 83, 11675 p, (1975).
Chemical Abstracts, vol. 83, 207279 g, (1975).

*Primary Examiner*—Christopher A. Henderson
*Attorney, Agent, or Firm*—Ladas & Parry

[57] ABSTRACT

Semipermeable membranes of polyacrylonitrile or copolymers of acrylonitrile and other ethylenically unsaturated monomers are chemically modified through reaction with (a) hydroxylamine and (b) a poly functional ionic colorless cyclic carbonic acid imide-halide capable of reaction with amidoxime groups, and optionally containing ionic groups. The new membranes show good compaction and solvent resistance and are stable over a broad temperature and pH range. They are suitable for reverse osmosis and especially ultrafiltration processes.

10 Claims, No Drawings

MODIFIED ACRYLONITRILE POLYMER CONTAINING SEMIPERMEABLE MEMBRANES

The present invention relates to semipermeable membranes showing improved compaction and solvent resistance against organic solvents. The membranes are manufactured from polyacrylonitrile or copolymers of acrylonitrile and other ethylenically unsaturated comonomers and then chemically modified.

The chemical modification can be carried out easily and is independent of the initial pore size or cutoffs of the basic-membranes. Thus, membranes classified as porous, microporous, ultrafiltration (UF), reverse osmosis (RO), or intermediates between UF and RO can all be modified by the inventive process.

It is well known that acrylonitrile copolymers or polyacrylonitriles are potential raw materials for the production of membranes, with a range of pore sizes between 10 μm to 1 Å. They are, however, especially useful for making ultrafiltration membranes (GB No. 1,327,990, EP No. 1233 A). One drawback of known membranes from acrylonitrile polymers is their compactability (especially the more open or porous UF membranes) under relatively low pressures, and their sensitivity to many organic solvents.

The patent literatures cites many examples of modification procedures to improve these disadvantages (GB No. 2011828 A, GB No. 2016,301 A, GB No. 1,569,563, DE No. 2942763). These methods suffer from one or more defects, such as need for expensive reagents and/or organic solvents and/or anhydrous conditions, incomplete crosslinking and/or poor control over the extent of modification, and/or poor long term performance, and in most cases significant flux reduction compared to the original membranes.

This is also true for polyacrylonitrile membranes, modified via hydroxylamine with and without additional steps, described in e.g. GB No. 1,569,653, C.A. 83, 11675p (1975) or C.A. 83, 207279 g (1975).

It was now found that the reaction of amidoxime functions with carbonic acid imide-halides (CAIH) (e.g. cyanuric chloride) and their derivatives, is unexpectedly rapid and efficient in crosslinking and insolubilizing the membrane containing the said amidoxime function, and overcomes many of the defects mentioned. The present invention describes a procedure for crosslinking polyacrylonitrile membranes, rapidly, efficiently, in aqueous systems requiring well known and relatively inexpensive chemicals, while maintaining most of the flux, or improving the flux of the original membranes.

Therefore, it is one object of the present invention to provide new semipermeable membranes of polymers on the basis of acrylonitrile, (polymers of the acrylonitrile series) which comprise membranes of polyacrylonitrile or copolymers of acrylonitrile and other ethylenically unsaturated monomers, chemically modified through reaction with (a) hydroxylamine and (b) a polyfunctional, optional ionic compound containing at least two functional groups capable of reacting with amidoxime groups, or a combination of polyfunctional, anionic and cationic compounds capable of reacting with amidoxime groups.

Other objects of the present invention are processes for the manufacture of the modified membranes, their use as UF- or RO-membranes, e.g. in fields relating to concentration and purification of liquids, e.g. separating salts from organic compounds or purifying waste waters.

These and other objects of the present invention will be apparent from the following detailed description.

In some cases, improved flux and antifouling may occur when the CAIH derivative is ionic containing sulfonic or carboxylic acid groups. The introduction of such groups makes the membrane's surface and pores more hydrophilic, thus increasing flux, in the case of $-SO_3H$ group minimizes fouling.

In many cases, especially for UF, RO/UF and RO membranes, wherein the pore size approaches molecular dimensions, the procedure of this invention will result in membranes with highter rejection or permselectivity.

The inventive membranes are obtained by chemical modification of a membrane of a polymer containing acrylonitrile structural units. A reaction sequence of two separate steps is necessary.

The process for the manufacture of the inventive membranes comprises (a) introducing into polyacrylonitrile or a copolymers of acrylonitrile and other ethylenically unsaturated monomers containing membranes amidoxime groups through reaction with hydroxylamine, and (b) reaction with a polyfunctional, optional ionic, compound containing at least two groups capable of reacting with amidoxime groups or with a combination of polyfunctional anionic and cationic compounds capable of reacting with amidoxime groups.

When using as component (b) said combination of anionic and cationic compounds so-called amphoteric membranes are obtained.

In an alternative route the process for the manufacture can be carried out in that a membrane containing [after modification with components (a) and (b)] still reactive groups is obtained.

The basic membrane for modification may be either microporous, UF, UF/RO or RO, which implies a range of pore sizes between 10μ to 1 Å. The basic membrane, which is modified according to the invention, as a rule consists of polyacrylonitrile or of acrylonitrile copolymers, in which case the proportion of acrylonitrile units in the copolymer is at least 5, preferably at least 20 and in particular at least 50%. Further suitable polymers (in addition to polyacrylonitrile), are those of alkyl ($C_1-C_6$)-acrylonitriles, for example, methacrylonitrile or hexylacrylonitrile, arylacrylonitriles, for example, phenylacrylonitrile, halogenacrylonitriles, in which halogen is fluorine, chlorine or bromine, for example, α-fluoracrylonitrile or α-chloracrylonitrile, and thioacrylonitriles.

Suitable comonomers, which can be copolymerized with acrylonitrile, are monomers which contain, for example, hydrophobic, hydrophilic, polar or ionic groups, especially for example, vinyl esters having 2 to 18 carbon atoms in the acid moiety, especially vinyl acetate, vinyl ethers having 3 to 12 carbon atoms, vinylpyridine, vinyl chloride, styrene, butadiene, acrylic acid or methacrylic acid or (meth)acrylates, for examples, those having 1 to 4 carbon atoms in the ester moiety. Further suitable monomers are maleic anhydride, 2-aminoethyl methacrylate and allyl compounds, for example, allyl alcohol, allyl- or methallyl-sulfonic acid and their salts (alkali metal salts), allyl halides or methallyl halides, allylamines or allyl p-toluenesulfonates. Further suitable compounds are terpolymers, for example of acrylonitrile, styrene and butadiene (ABS polymers), acrylonitrile/vinyl acetate/methylmethacrylate or acrylonitrile/methyl methacrylate/sodiumallylsulfonate, or tetrapolymers, based on acrylonitrile. The basic membrane can also contain mixtures of the (co)-polymers mentioned.

Further membranes, which are suitable for the modification according to the present invention, are also those in which some of the nitrile groups of the acrylonitrile units have been hydrolysed to carboxyl groups or reduced to amino groups. Furthermore, those membranes, in which the comonomers (in addition to the acrylonitrile) are chemically modified are also suitable. However, the membranes should contain at least 5% of nitrile groups, but preferably 20% or higher for the practice of invention, and such membranes are commercially available or are readily prepared by those skilled in the art. Process for their manufacture and corresponding casting solutions are known from the literature, especially the patent literature (GB No. 1 327 990, GB No. 2 016 301).

Compounds which have proved particularly advantageous as component (b) are cyclic carbonic acid imide-halides and in particular halogenodiazines or -triazines containing at least two reactive substituents. Cyanuric chloride and tetrachloropyrimidine and their ionic and hydrophilic derivatives have proved particularly advantageous.

Preferred are also those components (b) that are polyfunctional, ionic and colourless, containing at least two functional groups capable of reacting with amidoxime groups.

The ionic groups are preferably carboxylic and sulfonic-acid groups, optionally in form of their salts, or ammonium groups.

The cyclic carbon acid imid-halides used here as component (b) are advantageously:

(A) s-Triazines containing at least two identical or different halogen atoms bonded to carbon atoms, for example, cyanuric chloride, cyanuric fluoride, cyanuric bromide and also primary condensation products of cyanuric fluoride or cyanuric chloride or cyanuric bromide and, for example water, ammonia, amines, alkanols, alkylmercaptans, phenols or thiophenols; further of alkyl and aryl hydroxy compounds (alkanols, phenols), alkylamines and arylamines (anilines), containing ionic groups which will render the dihalogentated triazines water-soluble. Such ionic groups are sulfonic, carboxylic, quaternary ammonium, sulfonium or phosphonium groups.

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example, by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenpyrimidines are 2,4,6-trichloro- and 2,4,5,6-tetrachloro-pyrimidine; ionic and water-soluble derivatives of pyrimidine similar of those of (A) above.

(C) Halogenpyrimidinecarboxylic acid halides, for examples, dichloropyrimidine-5- or 6-carboxylic acid chloride;

(D) 2,3-Dihalogeno-quinoxaline-, -quinazoline- or -phthalazine-carboxylic acid halides or -sulfonic acid halides, such as 2,3-dichloroquinoxaline-6-carboxylic acid chloride or -6-sulfonic acid chloride, 2,6-dichloroquinazoline-6- or -7-carboxylic acid chloride and 1,4-dichlorophthalazine-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-carboxylic acid chloride or -5- or -6-sulfonic acid chloride; and (F) Halogeno-6-pyridazonyl-1-alkanoyl halides or 1-benzoyl halides, for example, 4,5-dichloro-6-pyridazonyl-1-propionyl chloride or -1-benzoyl chloride.

Polyfunctional CAIH reagents, which contain ionisable groups can be coloured, for example ionic reactive dyes, which can belong to various categories, for example, anthraquinone, formacyl metal complexes or preferably azo dyes which are optionally metal complexes. Reactive groups which enable these reagents to crosslink the membrane modified by hydroxylamine are: halogenated heterocyclic radicals, such as dihalogenquinoxalines, dihalopyridazonyl, dihalophthalazines, halobenzothiazoles and preferably halogenated pyrimidines or 1,3,5-triazines, such as dihalotriazines, 2,3-dihalopyrimidines or 2,4,6-trihalopyrimidines. Suitable halogen atoms are fluorine, bromine and especially chlorine atoms. Preferred colourless polyfunctional and ionic compounds may contain the same reactive groups.

Specific examples of reactive groups are dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, linked to the dye e.g. via —CONH—, —SO$_2$NH— or —NH—Ar—N═N— (Ar=phenylene or naphthylene).

Some preferred components are colourless reactive compounds or reactive azo dyestuffs containing sulphonic acid (—SO$_3$H) or carboxyl (—COOH) groups (either group may be also present in salt form, such as alkali metal salt (sodium salt), or ammonium groups, and as reactive groups dichlorotriazinyl, 2,4-dichloropyrimidinyl or 2,4,5-trichloropyrimidinyl radicals.

Ionisable groups which the membrane-modifying substances (or the membranes themselves) can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

When amphoteric membranes are prepared component (b) comprises preferably a combination of either anionic dichlorotriazinyl compounds with cationic dichlorotriazinyl compounds, or anionic dichlorotriazinyl compounds with cationic-2,4,5-trichloropyrimidyl compounds, or anionic 2,4,5-trichloropyrimidyl compounds with cationic dichlorotriazinyl compounds, or anionic 2,4,5-trichloropyrimidyl compounds with cationic 2,4,5-trichloropyrimidyl compounds, the anionic-groups being carboxylic or sulfonic acid groups, optionally in form of their salts, and the cationic groups being ammonium groups.

The reaction with the anionic and cationic species can be carried out in any order or simultaneously.

Specific examples of non-coloured ionic derivatives (b) which have been found useful are substituted triazines or pyrimidines such as compounds of formulae (3), (4) and (6) to (10) as hereinafter disclosed.

The modification procedure is carried out in, preferably, an aqueous solution, though organic solvents such as butanol, ethanol, acetone, dimethyl formamide, N-methyl pyrrolidone, alone or in combination with each other and/or water, may be used. The first reaction with hydroxylamine converts the nitrile groups to amidoxime with a conversion efficiency of 0.2 to 30%, but preferably 1 to 10%. (Higher values may be used, but may result in excessively brittle membranes). This reaction is usually carried out with a 1 to 10% solution of hydroxylamine hydrochloride, hydroxylamine sulfate or hydroxylamine, adjusted to a pH of preferably 6.0–7.0 with sodium carbonate or sodium hydroxide though other bases may be used. The optimum temperatures are a function of the hydroxylamine concentration, pH, and time of reaction (about 2 to 60 minutes). Thus, for a 10% hydroxylamine solution at a pH of 6.5, reaction temperatures between 50° to 70° C. are usually carried out from 2 to 15 minutes. Higher temperatures require shorter times. Lower reaction temperatures require correspondingly longer reaction times. Lower concentrations of hydroxylamine require longer times or higher temperatures for equivalent modification.

Elemental Analysis has been used to determine the concentration of amidoxime groups during the first step of the modification reaction. The percentages of C, N, H and O, before and after 100% conversion of the nitrile groups, are:

The extent of conversion for membranes of poly(acrylonitrile-vinylacetate) (97:3) is also determined by elemental analysis. The results are given in Table B.

TABLE B

Extent of Conversion of nitriles to amidoxime groups in Membranes of poly(acrylonitrile-vinylacetate).

| Time of Reaction (min) | Temp. of Reaction (°C.) | % Carbon Content | % Conversion of nitrile to amidoxime* |
|---|---|---|---|
| 10 | 45 | 65.10 | 3.00 |
| 15 | 45 | 64.00 | 7.20 |
| 30 | 45 | 60.57 | 20.3 |
| 10 | 50 | 64.68 | 4.60 |
| 15 | 50 | 63.56 | 8.90 |
| 10 | 55 | 63.10 | 10.67 |
| 15 | 55 | 61.17 | 18.07 |
| 0 | — | 67.50 | — |

*In calculating % conversion, an acrylonitrile carbon content of 65.88% is used.

From the above results, it is readily apparent that the quantity of amidoxime groups introduced into the membrane is a function of the reaction temperature and time of reaction. In general, it appears that:

(1) Increasing the temperature of the reaction increases the extent of conversion.
(2) Longer reaction times increase the degree of conversion.
(3) The conversion rate (% conversion vs. time) is in general an increasing function of temperature.

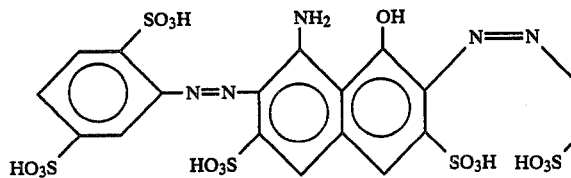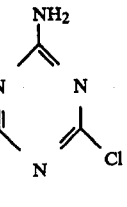

The course and extent of the reaction on membranes is followed by measuring the change in % C with elemental analysis. In effect, if 100% conversion corresponds to a 26.06% loss of carbon, then the following ratio should give the % conversion:

$$\frac{\% \text{ carbon before modification} - \% \text{ carbon after modification}}{26.06}$$

Pure polyacrylonitrile membranes were cast and reacted with a 10% NH$_2$OH solution at 60° C. for 2, 5 and 10 min. The results are given in Table A.

TABLE A

| Extent of Conversion of nitriles to amidoximes | | |
|---|---|---|
| Time of Reaction (min) | % Carbon (measured) | % Conversion of nitrile to amidoxime |
| 0 | 66.83 | — |
|   | 66.60 |   |
| 2 | 66.68 | — |
|   | 66.78 |   |
| 5 | 64.10 | 10.32 |
|   | 63.93 |   |
| 10 | 66.83 | 22.5 |
|   | 60.88 |   |

The change in carbon values after two minutes is very small compared to zero reaction time. The other values—after 5 and 10 minutes—are 10.32 and 22.5%, respectively.

In conclusion, however, under the usual conditions of modification the first step of hydroxylamine at 55° to 60° C. converts 7% to 10% or 1.2 to 1.8 moles of nitrile groups to amidoxime functions.

The reaction of CAIH is a function of pH-values (about 4 to 11), time (about 1 minute to 5 hours), concentration of amidoxime functions, reagent concentration and reactivity, of the reactive medium (i.e. solvent) and of the temperature (about 0° to 60° C.). The more reactive agents, such as cyanuric chloride, require lower temperatures and reaction times, and the extent of reaction is very sensitive to pH.

Thus, a 2% aqueous cyanuric chloride (the concentration of cyanuric chloride may be varried between 0.1 to 10%, but preferably between 0.5 to 5%) may be reacted efficiently at 0° to 5° C. for 1 to 10 minutes. If the pH is 6 to 7, the extent of reaction is less than at more basic conditions (pH=9 to 10). Less reactive reagents, such as tetrachloro pyrimidine may be advantageously reacted at 10° to 60° C. for 5 to 30 minutes within a pH range of 4 to 10.

It is understood that the exact reaction conditions may be carried beyond the stated ranges by lowering or increasing one reaction parameter with respect to another. Thus, lower concentrations require longer reaction times or higher temperature. Or, if lower temperatures are desirable, it may be necessary to increase time or the pH of the reaction. Similar considerations hold for CAIH reagents of different reactivity.

The reaction media is preferably water, though organic solvents (e.g. 20% acetone) or surfactants may be present to increase the solubility of certain CAIH reagents (e.g. cyanuric chloride, tetrachloropyrimidine). If the CAIH is an ionic or water soluble compound, such additives may not be important. In general, under the usual reaction conditions one molecule of CAIH will react with two equivalents of amidoxime groups to give a cross-linked membrane. Additional reactive groups and/or ionic or hydrophilic groups on the CAIH molecule are thus fixed to the membrane. It is the above said crosslinking and the ionic groups that confers upon the inventive membranes, their novel and useful characteristics. In one useful variation, both anionic and cationic group—are bound to the same membrane using cationic and anionic derivatives of CAIH, forming thus amphoteric membranes. Such membranes are known to have a high salt permeability and are useful in separating salt (NaCl) from high molecular weight solutes.

While the most preferred membrane is made from polyacrylonitrile and preferably polyacrylonitrile copolymers, the reaction of amidoxime functions with CAIH reagents may be affected by the nature of the copolymer because of steric, electrostatic or inductive effects, requiring different reaction times, temperatures of pH. Membrane morphology may also effect reaction rates, wherein the extent of reaction is a function of, for example, membrane crystallinity or density.

It has been observed that the reactivity of CAIH compounds is enhanced when reacted with amidoximes in general, and especially rapid when the reaction is between CAIH and alkyl amidoximes or with polyacrylonitrile or its copolymer converted in part or totally to amidoximes. Thus, the reactivity of CAIH compounds, such as cyanuric chloride or tetrachloropyrimide and their derivatives is much faster on all chloro groups with polyamidoximes that would be expected from its reactivity with monomeric amines or hydroxyl compounds.

The reaction of component (b) (for example, cyanuric chloride) with the reactive amidoxime groups of the membrane modified, according to reaction step (a), can easily result in undesired excessively crosslinking and thus, excessively brittle membranes. Thus, in a variant of the modification process, it is therefore also possible to hydrolyse or to mask some of the reactive amidoxime groups (for example, by competitively reactions with compounds containing amino groups or with hydroxy or thio compounds or isocyanates, ammonia, hydrogen sulfide, hydrazine, phenyl, isocyanate, polyvinyl alcohols or polyethyleneimines) while (or even prior to) reacting (b) with the amidoximes groups.

Different degrees of crosslinking may be obtained by the present invention. The degree of swelling in a solvent such as N-methylpyrrolidone is a good measure of the extent of crosslinking (such solvents dissolve, in most cases the original unmodified membrane). Membranes that are excessively brittle do not swell at all, and membranes that swell to dimensions of about 500% may be insufficiently crosslinked for many applications.

The invention is usually practiced by converting nitrile functions to amidoxime functions on preformed membranes. In another variation, the membrane can be formed from polymeric materials containing amidoxime functions. The conversion of nitrile to amidoxime functions may be preformed before preparation of the casting solution or it may be carried out in the casting solution prior to the process of casting and membrane formation, or on the preformed membrane. In this way, crosslinked membranes can be manufactured if the acrylonitrile polymers are first modified, cast into membranes and then modified further with CAIH.

The function of the porous support is to impart mechanical strength to a mechanically weak membrane which controls the flux and rejection properties of the composite system. Suitable support materials are water-insoluble and may be chosen from polyacrylonitriles, polysulfones, polyamides, polyolefines such as polyethylenes or polypropylenes, polyester (non-wovens) or cellulosics or mixtures of said materials. The thickness of the support may be in the range of 10 microns to 2 mm.

The process for manufacturing the inventive support membranes comprises casting on one surface of a porous support, an organic (dimethylformamide, N,N-dimethylacetamide, N-methylpyrrolidone) casting solution of a polyacrylonitrile or an acrylonitrile copolymer modified by hydroxylamine and immersing the obtained wet film in water of ambient (room) temperature or in ice water, optionally in the presence of additives such as surfactants or organic solvents. The time between casting and the said immersion may vary from 0 to 24 hours without the application of heat or vacuum.

Optionally the casting solutions may contain such additives that are known to influence final membranes porosity and mechanical stability for example cosolvents and/or non-solvents and/or inorganic and organic salts and/or surfactants.

For practical purposes the thickness of the wet film layer should be in a range of 0.05 to 2 mm preferably between 0.1 and 0.4 mm. Thinner or thicker films are also possible.

Depending on the intended application, the membranes can be in various forms, for example in the form of sheets, leaves or tubes, tublets or in the form of a pocket, bag, cone or of hollow fibres. When subjected to severe pressure, the membranes can, of course, be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membranes to heat treatment (50° to 140° C.) before or after their chemical modification it is possible to change the pore size and thus the flux and the rejection of the membranes.

Thus, for example, by subjecting the membranes to heat treatment before or after their chemical modification it is possible to change the pore size and thus the flux and the rejection of the membranes.

The average charge density (i.e. the content of ionisable groups) of the membrane is advantageously 1 to 2.500 milieequivalents and preferably 10 to 1.500 miliequivalents per kilogramm of dry membrane, after the modification with ionic CAIH reagents.

The inventive membranes are suitable for various separation (diffusion) processes, such as reverse osmosis or ultrafiltration processes for aqueous or aqueous/organic solutions. They exhibit improved temperature stability, are resistant to high and low pH-values and further their pressure stability and their solvent resistance are good.

Reverse osmosis or ultrafiltration processes for concentrating and/or purifying liquids or separating components dissolved in those liquids comprise disposing on one side of the inventive semipermeable membrane a solution with a solute and applying a hydraulic pressure against said solution and said membrane, said pressure being greater than the osmotic pressure of said solution.

The advantages of the inventive membranes can be summarized as follows.

1. Use at pH values of about 2 to 10 and temperatures of up to 70° C.

2. Improvement in solvent resistance to the extent that the membrane is no longer soluble in the solvents of polyacrylonitrile (e.g. N,N-dimethyl-formamide or N-methyl-pyrrolidone).

3. Improved resistance to high pressure (good stability). Pressures between about 2 and 100 bars, preferably 2 and 40 bars and especially 2 to 30 bars.

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge.

1. The purification of effluents which are obtained from the production and use of dyes and fluorescent brighteners.

2. The separation of proteins or hormones which have similar molecular weights but are of opposite charge.

3. The separation of ionic surfactants (detergents, wetting agents or dispersants) from other chemicals which are still present in the reaction mixture after the preparation of the surfactants (by-products, excess starting materials).

4. The removal of ionic surfactants from effluents.

5. The separation of ionic molecules (salts) from aqueous solution, i.e. the concentration of aqueous solutions which contain metal complexes, surfactants, dyes or proteins.

6. The separation of charged compound from compound with no charge.

The separation effect (the rejection) of the membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to pressure of 14 bars. The solution is stirred magnetically. The liquid which collects on the outlet side of the membrane is examined to determine its content (concentration) $c_2$ of the substance to be tested. 3 samples of 5 ml each being taken from the start of the experiment. In general, the amount which flows through the membrane and the composition of the 3 samples are constant. The rejection can be calculated from the values obtained, using the equation.

$$R = (c_1 - c_2)/c_1 \cdot 100\%$$

The amount of the material passed through the membrane per surface and time unit is found to be:

$$F = V \cdot S^{-1} \cdot t^{-1}$$

V: volume
S: membrane surface area
t: time

F is appropriately expressed in m$^3 \cdot$m$^{-2} \cdot$d$^{-1}$, i.e. the number of cubic meters per square meter surface area of the membrane and per day, or in l m$^{-2}$h$^{-1}$, i.e. liters per square meter surface area of the membrane per hour.

In addition to the measurements on flat membranes, measurements on tubular membranes 60 cm long and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent flow, under pressure. The flow rate is kept constant at 10–15 liters per minute. The rejection (R) and the flux are calculated in the same way as for the flat membranes.

In the following examples, dye of formula (1) is used as a test solute; the compounds of formulae (2) to (10) are used as component (b).

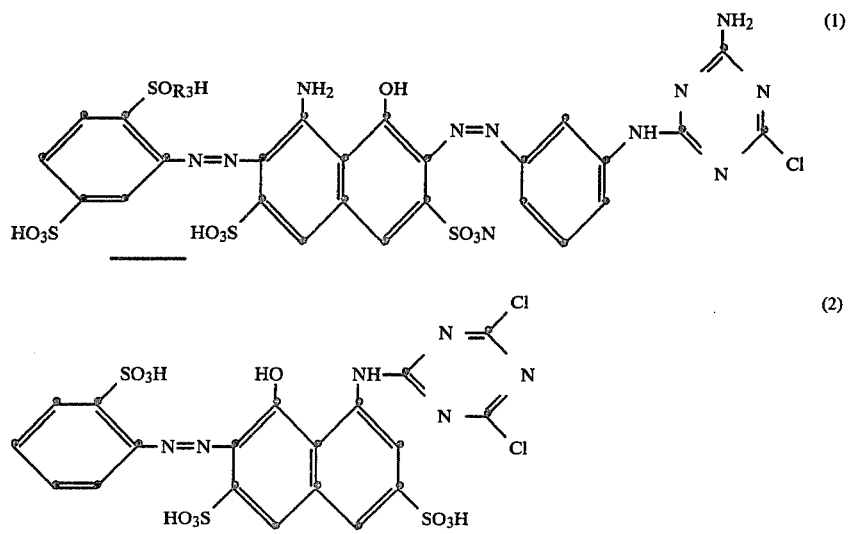

-continued
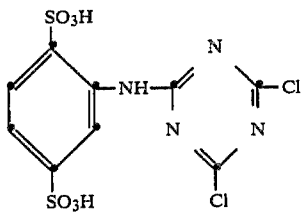
(3)
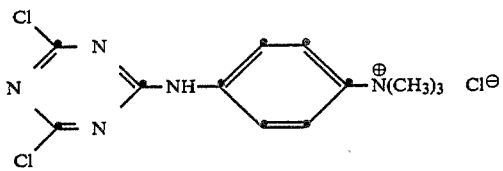
(4)
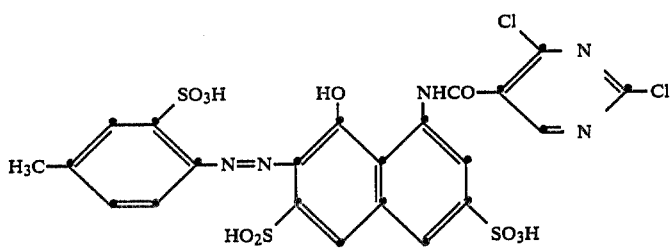
(5)
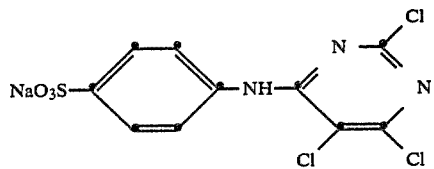
(6)
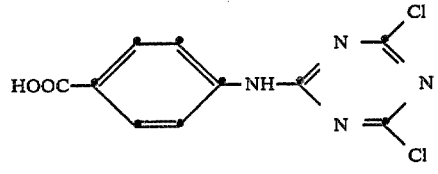
(7)
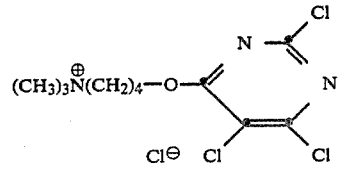
(8)
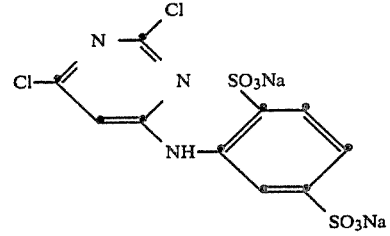
(9)
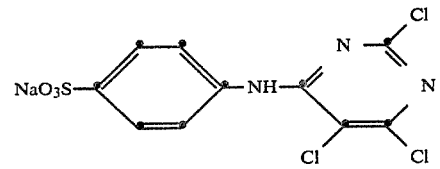
(10)

EXAMPLE 1

A membrane which consists of an 85:15 acrylonitrile/vinyl acetate copolymer being suitable for ultrafiltration and having the following rejection:
2% sodium chloride solution: 6%
1% sodium sulfate solution: 10%
Dextrin (molecular weight 70,000): 60%
1% solution of the dye of the formula (3): 34%
is treated for 5 minutes at 65° C. with an aqueous solution which contains 10% of hydroxylamine and 7.5% of sodium carbonate and has a pH value of 6.5. The membrane is then removed from the solution and placed in a stirred solution of 370 mg of cyanuric chloride per 100 mg of membrane. For a period of 30 minutes and at 0° C., this solution is kept at a pH value of 10 by the addition of 1N sodium hydroxide solution. After washing the membrane in ice-water a cross-linked membrane is obtained insoluble in NMP or DMF. When the membranes are in operation for 100 hours, the flux of the 0.1% solution of the dye of the formula (1) falls from 94 l/m²·h to 83 l/m²·h, at 20 bar, while with a conventional (non-modified) polyacrylonitrile membrane, the flux falls from 100 to 40 l/m²·h when the membrane is in operation for 100 hours. During the test the membrane is cleaned every 24 hour by washing it with an aqueous solution of a tenside.

The membranes disclosed in the following examples also display similar properties.

EXAMPLE 2

15 g of an acrylonitrile/vinyl acetate (97:3) copolymers is dissolved in 70 g N-methylpyrrolidone (NMP), filtered and cast (0.4 mm wet film thickness) on a glass plate and immersed immediately in water at ambient conditions. After leaching for 24 hours the membrane is subjected to a modification of hydroxyl amine and a carbonic acid imide-halide, and its degree of swelling is measured, in NMP. Membranes modified by only $NH_2OH$ or only CAIH are initially soluble in NMP. The experimental conditions and results are given below and in Table 1.

(A) The above membrane is modified by immersion in a $NH_2OH-HCl$ (10%) and $Na_2CO_3$- (7.5% to adjust pH to 6.0-7.0) solution at 60° C. for 5 minutes. After washing for 1 hour in tap water, the membrane is immersed in NMP and found soluble. If the membrane is left to stand for 24 hours immersed in water before immersion in NMP, it swells, but does not dissolve. For the purpose of this invention, however, the extent of reaction with CAIH is shown by the membrane's insolubility immediately after the reaction.

(B) The membrane is immersed only in a 2% aqueous suspension of cyanuric chloride at pH 9.0, 0° C. for 5 minutes. After washing it is placed in NMP and dissolves.

(C) If the above membrane is modified by hydroxylamine, as in (A), washed and modified with a 2% aqueous suspension of cyanuric chloride as in (B), then it does dissolve as swells only to the extent of 2%.

(D) (C) is repeated with the exception that the pH of the cyanuric chloride solution is 7.0 instead of 9.0, the degree of swelling is 20% instead of 2%, respectively. This is to show how the reaction conditions may affect the degree of swelling. In many cases, a higher degree of swelling may be preferable, as the lower degree of swelling (for example 2% in (C)) was indicative of a highly brittle membrane, while membrane (D) was more elastic and easily handled.

(E) (C) is repeated using tetrachloropyrimidine instead of cyanuric chloride.

(F) (C) is repeated using the dyestuff of formula (2) instead of cyanuric chloride.

(G) (C) is repeated using the compound of formula (3) instead of cyanuric chloride at pH 9-10, 25° C. for 10 minutes.

(H) (C) is repeated using the compound of formula (4) at pH 9-10, 25° C. for 10 minutes, instead of cyanuric chloride.

(I) (C) is repeated using the dyestuff of formula (5) at pH 9-10, 20° C. for 4 hours instead of cyanuric chloride.

TABLE I

The Affect of modification (crosslinking) of acrylonitrile/vinyl acetate membranes after reaction with hydroxylamine.

| 10% $NH_2OH-HCl$ 7.5% $Na_2CO_3$ | Cyanuric Chloride 2%, Water/Acetone 90:10 | Tetrachloro pyrimidine | compound of formula | % degree of swelling in NMP* |
|---|---|---|---|---|
| (A) 60° C., 5 min. | — | — | — | Dissolves |
| (B) | 5 min., pH 9.0 | — | — | Dissolves |
| (C) 60° C., 5 min. | 5 min., pH 9.0 | — | — | 2.0% |
| (D) 60° C., 5 min. | 5 min., pH 7.0 | — | — | 20% |
| (E) 60° C., 5 min. | — | 10° C., 5 min. pH 9-10 2% (10% Acetone) | — | 70% |
| (F) 55° C., 7 min. | — | — | Formula (2), pH 9-10 5 min., 25° C. | 116% |
| (G) 55° C., 7 min. | — | — | Formula (3), pH 9-10 25° C., 10 min. | 95% |
| (H) 55° C., 5 min. | — | — | Formula 4 pH 9-10 25° C., 10 min. | 125% |
| (I) 55° C., 10 min. | — | — | Formula 5, pH 9-10 50° C., 4 hours | 300% |

*Degree of Swelling was measured by measuring the difference in dimension of a 2.5 cm diameter disc of membrane, before and after immersion in N—methylpyrrolidone for 6 hours. The swelling experiment is done immediately after the modification procedure.

EXAMPLE 3a 15 g of an acrylonitrile/vinyl acetate (97:3) copolymer is dissolved in dimethyl formamide, filtered through a paper filter, degassed and cast (0.2 mm wet film thickness) on a sheet of polyester non-woven material. Immediately after casting the wet film (on support) is immersed in a bath of water at ambient conditions, resulting in a water-insoluble ultrafiltration membrane adhering to its support. Its flux and rejection to dyestuff of formula (3) (1500 ppm) is 231 l/m²·h and 74.3% at 10 bars. After modification, as in Example 1, the flux and rejections of the modified membrane to dyestuff of formula (1) (1500 ppm) at 10 bars is 180 l/m²·h and 82%, respectively. The membrane is crosslinked and insoluble in NMP and DMF.

EXAMPLE 3b

Example (3a) is repeated using instead of cyanuric chloride an aqueous mixture of 1% of each of compounds of formulae (3) and (4). The resultant amphoteric membrane is crosslinked and has a salt permeation of 95% for a 1.5% NaCl solution.

EXAMPLE 3c

Example (3a) is repeated using the compound of formula (6) at pH 8–9 and 10° C. for 10 minutes instead of cyanuric chloride—the resultant membrane is crosslinked and insoluble in NMP.

EXAMPLE 3d

Example (3a) is repeated using the compound of formula (7) instead of cyanuric chloride, resulting in a crosslinked membrane with fixed carboxyl groups.

EXAMPLE 3e

Example (3a) is repeated using a compound of formula (8) instead of cyanuric chloride giving a cationic crosslinked membrane.

The membranes obtained according to Examples (3c) to (3e) show approximately the same performance as the membrane according to Example (3b).

EXAMPLE 4

Example 3a is repeated with the exception that the acrylonitrile polymer is an acrylonitrile/methallylsulfonate (sodium salt) (ratio 90/10) copolymer and the solvent is N-methyl pyrolidone. Prior to modification, as in Example 3a, the flux and rejection to dyestuff of formula (1) (1500 ppm, 10 bars) are 57.1 l/m²·h and 33.8%, respectively; after modification: 51.8 l/m²·h and 50%, respectively. The membrane is also crosslinked and insoluble in NMP and DMF.

EXAMPLE 5

Example 3a is repeated and modified with the substitution of 2,4,6-trifluoro-5-chloropyrimidine for cyanuric chloride (reaction of the fluoro-pyrimidine and membrane taking place at 10° C. for 10 minutes). The resultant membrane is crosslinked and insoluble in NMP and DMF.

EXAMPLE 6

9.0 grams of a copolymer of acrylonitrile-vinyl acetate (92% acrylonitrile and 8% vinyl acetate) are dissolved in 51 grams of dimethylformamide (DMF). After dissolution, the polymer solution is heated to 75° C. and 3.6 grams hydroxylamine hydrochloride ($NH_2OH \cdot HCl$) and 2.5 grams sodium carbonate are added, and the solution is maintained at 75° C. for an additional 3 hours.

The solution suspension is cooled to room temperature and filtered to remove the undissolved sodium carbonate. The resultant solution is left to stand to get rid of air bubbles prior to casting. A sheet of a polyester non-woven support is adhered under slight tension at its end with a pressure adhesive tape. The casting solution is then poured onto one end and cast with a casting bar at a wet film thickness of 0.20 mm. The resultant wet film is immersed in a bath of deionized water at ambient conditions, resulting in a water-insoluble ultra-filtration membrane on the non-woven support to which it adheres.

This membrane is then modified further by immersing it in a 2% solution of cyanuric chloride at pH 9–10 and 0° C. for ½ hour. The resultant membrane is insoluble in NMP and DMF.

EXAMPLE 7

Example 3a repeated using, instead of the copolymer of acrylonitrile/vinyl acetate, a terpolymer of acrylonitrile (68–74%), butadiene (6–7%) and methacrylate (21–25%). The resultant membrane is crosslinked and insoluble in NMP and DMF. The rejection and flux of the unmodified and modified membranes to dye of formula (1) is 40 and 60% and 180 l/m²; h and 170 l/m²; h 10 bar, respectively.

EXAMPLE 8

A membrane of an acrylonitrile/methallylsulfonate (sodium salt) (90/10)-copolymer is prepared and modified as in Example 3a with the change that N-methylpyrrolidone was used instead of dimethylformamide. The supported membrane has, before modification a flux and rejection to dyestuff of the formula (2) (1500 ppm) at 10 bars, of 66 l/m²·h and 42%, respectively; after modification: 70 l/m²·h and 56%, respectively. The membranes are crosslinked and insoluble in NMP and DMF.

EXAMPLE 9

A 23% solution (w/v) of a tri-polymer of acrylonitrile (68–74%), butadiene (6–7%), methyl-methacrylate (21–25%), in dimethylacetamide is prepared and filtered through a paper filter and cast on a support and modified as in Example 3a. Before modification, the membrane's rejection and flux to 1500 ppm of the dye of formula (1) are 50% and 190 l/m²·h, respectively, at 10 bar; after modification they are 78.6% and 130 l/m²·h, respectively.

EXAMPLE 10

Polyacrylonitrile homopolymer, synthesized by emulsion polymerisation (W. R. Sorensen and T. W. Campbell, Preparative Methods of Polymer Chemistry, 2nd Edition, Interscience Publishers, 1968, p. 236) is dissolved in N,N-dimethyl-formamide and filtered to make a 20% solution. The subsequent casting support and modification procedure is as in Example 3. Before modification, the membrane's rejection and flux are 75% and 271 l/m²·h, respectively; after modification, they are 85% and 180 l/m²·h, respectively at 10 bar and a solution of 1500 ppm of the dye of formula (1). The membranes are crosslinked and insoluble in DMF or NMP.

EXAMPLE 11

A membrane according to Example 2 is made and modified with $NH_2OH$ as in Example (2A), but at a temperature of 55° C. for 15 minutes. The membrane is then immersed in a 1% solution of the compound of formula (3) for 2 minutes at 0° C., followed by a 1% solution of formula (8) at room temperature for 5 minutes. The flux and rejection to dye of formula (1) (0.15% aqueous solution) is 220 l/m²·h and 93.6% at 20 bar. The unmodified membrane has a flux of 200 l/m²·h and a rejection of 61%, respectively at 20 bar.

We claim:

1. A semipermeable membrane of an acrylonitrile polymer which is either polyacrylonitrile or a copolymer of acrylonitrile with an ethylenically unsaturated monomer selected from the group consisting of vinyl acetate, a vinyl ether, vinyl pyridine, vinyl chloride, styrene, butadiene, (meth)acrylic acid or a (meth)acrylate, maleic anhydride, 2-aminoethyl methacrylate, an allyl compound, or terpolymers or tetrapolymers based on acrylonitrile, or mixtures thereof wherein the acrylonitrile content of the copolymer, terpolymer or terapolymer is at least 5% by weight, said polymer having been chemically modified by reaction with (a) hydroxylamine and (b) a polyfunctional ionic colourless cyclic carbonic acid imide halide containing at least two functional groups capable of reacting with amidoxine groups, said imide halides being selected from the group consisting of s-triazines containing at least two halogen atoms bonded to carbon atoms and primary condensation products thereof, pyrimidines having at least two reactive halogen atoms, halogen pyrimidine carboxylic acid halides, 2,3-dihalogenoquinoxaline-, 2,3-dihalogeno-quinazoline or 2,3-dihalogeno-phthalazinecarboxylic acid halides or sulfonic acid halides, 2-halogeno benzthiazole- or 2-halogenobenzooxazole-carboxylic acid halides or sulfonic acid halides and halogeno-6-pyridazonyl-1-alkanoyl halides and halogeno-6-pyridazonyl-1-benzoyl halides or a combination of polyfunctional anionic and cationic cyclic carbonic acid imide halides capable of reacting with amidoxine groups the cationic compounds being selected from ammonium dichlorotriazinyl compounds and ammonium trichloropyrimidyl compounds and the anionic compounds being selected from dichlorotriazinyl compounds or 2,4,5-trichloropyrimidyl compounds which contain carboxylic or sulfonic acid groups.

2. A membrance according to claim 1 wherein a proportion of acrylonitrile in the copolymers is at least 30% by weight.

3. A membrane according to claim 1, wherein component (b) is halogenodiazine or -triazine compound which contains at least 2 reactive substituents.

4. A membrane according to claim 3, wherein component (b) is a cyanuric halide or a tri- or tetrahalopyrimidine.

5. A membrane according to claim 1 wherein component (b) contains carboxylic or sulfonic acid groups or ammonium groups as ionic groups.

6. A membrane according to claim 5, wherein compound (b) is a colourless halogenodiazine or -triazine derivative.

7. A membrane according to claim 1 wherein component (b) comprises a combination of either anionic dichlorotriazinyl compounds with cationic dichlorotrivinyl compounds, or anionic dichlorotriazinyl compounds with cationic 2,4,5-trichloropyrimidyl compounds, or anionic 2,4,5-trichloropyrimidyl compounds with cationic dichlorotriazinyl compounds, or anionic 2,4,5-trichloropyrimidyl compounds, with cationic 2,4,5-trichloropyrimidyl compounds, the anionic groups being carboxylic or sulfonic acid groups, and the cationic groups being ammonium groups.

8. A membrane according to claim 7 wherein the component (b) comprises as anionic compounds of formulae

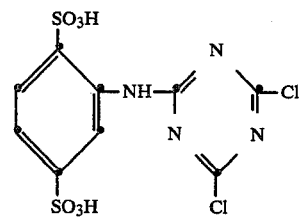 (3)

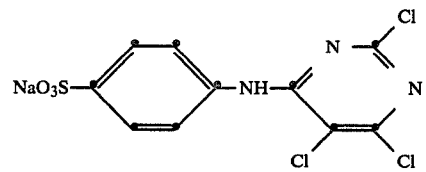 (6)

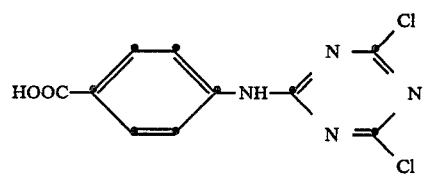 (7)

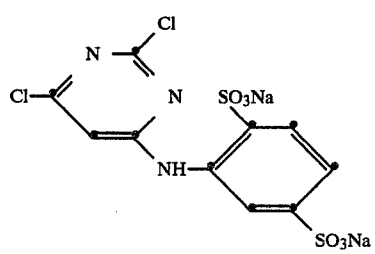 (9)

and

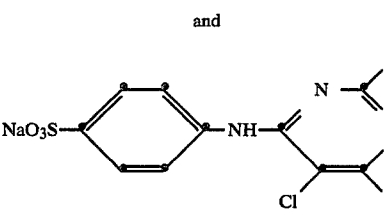 (10)

and as cationic compounds those of formulae

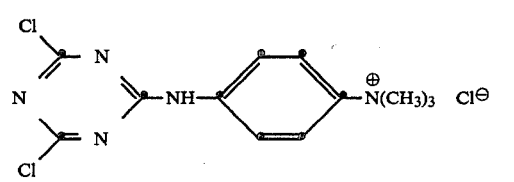 (4)

and

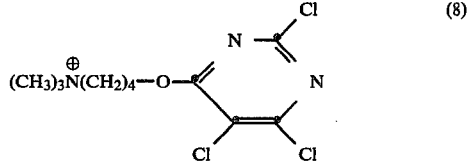 (8)

9. A membrane according to claim 5, wherein component (b) contains carboxylic or sulfonic acid groups in the form of their salts.

10. A membrane according to claim 7, wherein the anionic carboxylic or sulfonic acid groups are present in the form of their salts.

* * * * *